United States Patent
Dang et al.

(10) Patent No.: US 10,169,986 B2
(45) Date of Patent: Jan. 1, 2019

(54) INTEGRATION OF PERSONALIZED TRAFFIC INFORMATION

(71) Applicant: International Business Machines Corporation, Armonk, NY (US)

(72) Inventors: Ya Bin Dang, Beijing (CN); Feng Li, Beijing (CN); Qi Cheng Li, Beijing (CN); Shao Chun Li, Beijing (CN); Guang Tai Liang, Beijing (CN); Xin Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 14/833,179

(22) Filed: Aug. 24, 2015

(65) Prior Publication Data
US 2017/0061792 A1    Mar. 2, 2017

(51) Int. Cl.
G08G 1/09        (2006.01)
G08G 1/01        (2006.01)
(Continued)

(52) U.S. Cl.
CPC .......... G08G 1/0112 (2013.01); G01C 21/26 (2013.01); G01C 21/34 (2013.01);
(Continued)

(58) Field of Classification Search
CPC .......... G08G 1/07; G08G 1/962; G08G 1/93; G08G 1/92; G08G 1/133; G08G 1/112;
(Continued)

(56) References Cited

U.S. PATENT DOCUMENTS 5,635,924 A * 6/1997 Tran ................. G08G 1/096716
                                                         340/905
6,317,058 B1 * 11/2001 Lemelson ................ G08G 1/07
                                                         340/905
(Continued)

FOREIGN PATENT DOCUMENTS

CN        1445731 A     10/2003
CN      100576282 C     12/2009
(Continued)

OTHER PUBLICATIONS

Freeman, Matt, "Traffic information services: Making your commute better", pp. 1-9, Copyright © 1996-2015, Crutchfield New Media, LLC, <http://www.crutchfield.com/S-tHYQa5nevLc/learn/learningcenter/car/navigation/traffic_services.html>.
(Continued)

*Primary Examiner* — Hoi Lau
(74) *Attorney, Agent, or Firm* — David M. Quinn; Brian M. Restauro

(57) ABSTRACT

Integration of personalized traffic information is provided. Contextual information for a client device is collected. Based, at least in part, on the contextual information, traffic information is received. The traffic information is received from one or more broadcast stations to which the traffic information has been mapped based, at least in part, on classification of the traffic information. A communications device is caused to communicate the traffic information.

20 Claims, 8 Drawing Sheets

(51) Int. Cl.
*G01C 21/26* (2006.01)
*G01C 21/34* (2006.01)

(52) U.S. Cl.
CPC ..... *G01C 21/3415* (2013.01); *G01C 21/3492* (2013.01); *G08G 1/0141* (2013.01); *G08G 1/093* (2013.01)

(58) Field of Classification Search
CPC ............ G01C 21/3492; G01C 21/3415; G01C 21/26; G01C 21/34
USPC .............. 340/905, 988, 995.13, 539.13, 934; 701/414, 468, 423, 117, 210, 200
See application file for complete search history.

(56) References Cited

U.S. PATENT DOCUMENTS

| | | | | |
|---|---|---|---|---|
| 6,759,970 | B1* | 7/2004 | Horita | G08G 1/0962 340/905 |
| 7,486,201 | B2 | 2/2009 | Kelly et al. | |
| 7,505,732 | B2 | 3/2009 | McDonough et al. | |
| 7,657,367 | B1* | 2/2010 | Phuyal | G08G 1/0104 701/117 |
| 7,849,415 | B1* | 12/2010 | Serafat | G06F 9/546 709/206 |
| 8,200,204 | B2* | 6/2012 | Cho | G01C 21/26 455/414.2 |
| 8,489,324 | B2 | 7/2013 | Hendrey | |
| 9,047,649 | B2* | 6/2015 | Haag | G06Q 50/26 |
| 2002/0027511 | A1* | 3/2002 | Horita | G08G 1/0962 340/988 |
| 2002/0161518 | A1* | 10/2002 | Petzold | G01C 21/3492 701/414 |
| 2003/0229441 | A1* | 12/2003 | Pechatnikov | G01C 21/26 701/411 |
| 2003/0236613 | A1* | 12/2003 | Satoh | G01C 21/26 701/414 |
| 2004/0068364 | A1* | 4/2004 | Zhao | G01C 21/3492 701/468 |
| 2005/0093720 | A1* | 5/2005 | Yamane | G01C 21/3492 340/995.13 |
| 2005/0222760 | A1* | 10/2005 | Cabral | G01C 21/3492 701/423 |
| 2005/0222764 | A1* | 10/2005 | Uyeki | G01C 21/3415 701/414 |
| 2006/0276150 | A1* | 12/2006 | Ogasawara | G01C 21/26 455/152.1 |
| 2006/0287818 | A1* | 12/2006 | Okude | G01C 21/3492 701/423 |
| 2007/0038363 | A1* | 2/2007 | McGrath | G08G 1/093 701/117 |
| 2007/0106454 | A1* | 5/2007 | Nonaka | G08G 1/092 701/423 |
| 2007/0135990 | A1* | 6/2007 | Seymour | G08G 1/01 701/117 |
| 2007/0290839 | A1* | 12/2007 | Uyeki | G01C 21/3415 340/539.13 |
| 2008/0052407 | A1* | 2/2008 | Baudino | G06F 17/3087 709/238 |
| 2008/0234927 | A1* | 9/2008 | O'Neill | G01C 21/34 701/465 |
| 2010/0022228 | A1* | 1/2010 | Cho | G01C 21/26 455/414.2 |
| 2011/0098915 | A1* | 4/2011 | Disatnik | G01C 21/3415 701/533 |
| 2011/0298637 | A1* | 12/2011 | Posner | H04H 20/55 340/905 |
| 2012/0302157 | A1* | 11/2012 | Chen | G08G 1/096716 455/3.06 |
| 2013/0054493 | A1* | 2/2013 | McDysan | H04L 29/08 705/412 |
| 2013/0289860 | A1 | 10/2013 | Finnis et al. | |
| 2014/0074403 | A1* | 3/2014 | Shin | G08G 1/096816 701/537 |
| 2014/0278034 | A1 | 9/2014 | Marko | |
| 2015/0023168 | A1* | 1/2015 | Kotecha | H04W 28/0289 370/232 |
| 2015/0029043 | A1* | 1/2015 | Imai | G08G 1/0133 340/934 |
| 2015/0039210 | A1* | 2/2015 | Ahn | G01C 21/3492 701/117 |
| 2016/0012720 | A1* | 1/2016 | Boss | G08G 1/096822 701/118 |
| 2016/0323233 | A1* | 11/2016 | Song | G06Q 50/30 |
| 2017/0061792 | A1* | 3/2017 | Dang | G08G 1/0112 |

FOREIGN PATENT DOCUMENTS

| | | |
|---|---|---|
| CN | 101316144 B | 12/2010 |
| CN | 101903921 A | 12/2010 |
| CN | 102682616 A | 9/2012 |
| CN | 103632542 A | 3/2014 |

OTHER PUBLICATIONS

Lee et al. "Collaborative real-time traffic information generation and sharing framework for the intelligent transportation system", Information Sciences 180 (2010) 62-70, Information Sciences, Received in revised form Sep. 2, 2009, Accepted Sep. 4, 2009, © 2009 Published by Elsevier Inc., pp. 62-70, doi: 10.1016/j.ins.2009.09.004.

"Beijing Traffic Management Bureau", printed on Aug. 7, 2015, pp. 1-2, <http://sslk.bjjtgl.gov.cn/roadpublish/Map/trafficOutNew1.jsp>, machine translated.

"Multifunctional and real-time traffic into two major trends in the development of GPS", STARSOFT, Mar. 18, 2013, 1 page, <https://translate.google.com/translate?sl=zh-CN&tl=en&js=y&prev=_t&hl=en&ie=UTF-8&u=http%3A%2F%2Fwww.gps163.com%2Fnews%2Fnews_content.aspx%3FNewestID%3D1278&edit-text=>.

"Radio Data System", From Wikipedia, the free encyclopedia, pp. 1-9, This page was last modified on Aug. 15, 2015, <https://en.wikipedia.org/wiki/Radio_Data_System>.

"TMC Garmin (Derek) GPS of real-time traffic Comments", GPS channel YORK Dec. 28, 2010, Copyright (C) 1999-2015 Yesky.com, <https://translate.google.com/translate?sl=zh-CN&tl=en&js=y&prev=_t&hl=en&ie=UTF-8&u=http%3A%2F%2Fgps.yesky.com%2F380%2F11750380.shtml&edit-text=>, pp. 1-3.

"Travel Tips", Beijing.CN, printed on Aug. 7, 2015, 1 page, <https://translate.google.com/translate?hl=en&sl=auto&tl=en&u=http%3A%2F%2Fjtcx.beijing.cn%2Fjtxx%2Fcxts%2F>.

"Weibo", Copyright © 2009-2015 Weibo Beijing Weibo Internet Technology Co., Ltd., 1 page, <http://weibo.com/login.php?lang=en-us>.

\* cited by examiner

INTEGRATION OF PERSONALIZED TRAFFIC INFORMATION

TECHNICAL FIELD

The present disclosure relates to data processing and communications and, more specifically, processing and communications of traffic information.

BACKGROUND

Traffic jams have become a serious problem in many modern cities because infrastructure support is falling behind increasing urbanization and population. Drivers can receive real-time traffic information from Variable Message Signs (VMS), authorized traffic reports, digital map services, and social media.

SUMMARY

According to one embodiment of the present invention, a method is provided. The method includes: collecting, by one or more processors, contextual information for a client device; receiving, by one or more processors, traffic information based, at least in part, on the contextual information, wherein the traffic information is received from one or more broadcast stations to which the traffic information has been mapped based, at least in part, on classification of the traffic information; and causing, by one or more processors, a communications device to communicate the traffic information.

According to another embodiment of the present invention, a computer program product is provided. The computer program product comprises a computer readable storage medium and program instructions stored on the computer readable storage medium. The program instructions include: program instructions to collecting contextual information for a client device; program instructions to receive, based, at least in part, on the contextual information, traffic information, wherein the traffic information is received from one or more broadcast stations to which the traffic information has been mapped based, at least in part, on classification of the traffic information; and program instructions to cause a communications device to communicate the traffic information.

According to another embodiment of the present invention, a computer system is provided. The computer system includes one or more computer processors, one or more computer readable storage media, and program instructions stored on the computer readable storage media for execution by at least one of the one or more processors. The program instructions include: program instructions to collecting contextual information for a client device; program instructions to receive, based, at least in part, on the contextual information, traffic information, wherein the traffic information is received from one or more broadcast stations to which the traffic information has been mapped based, at least in part, on classification of the traffic information; and program instructions to cause a communications device to communicate the traffic information.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

The terminology used herein is for the purpose of describing particular embodiments only and is not intended to limit the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

Figure 1:
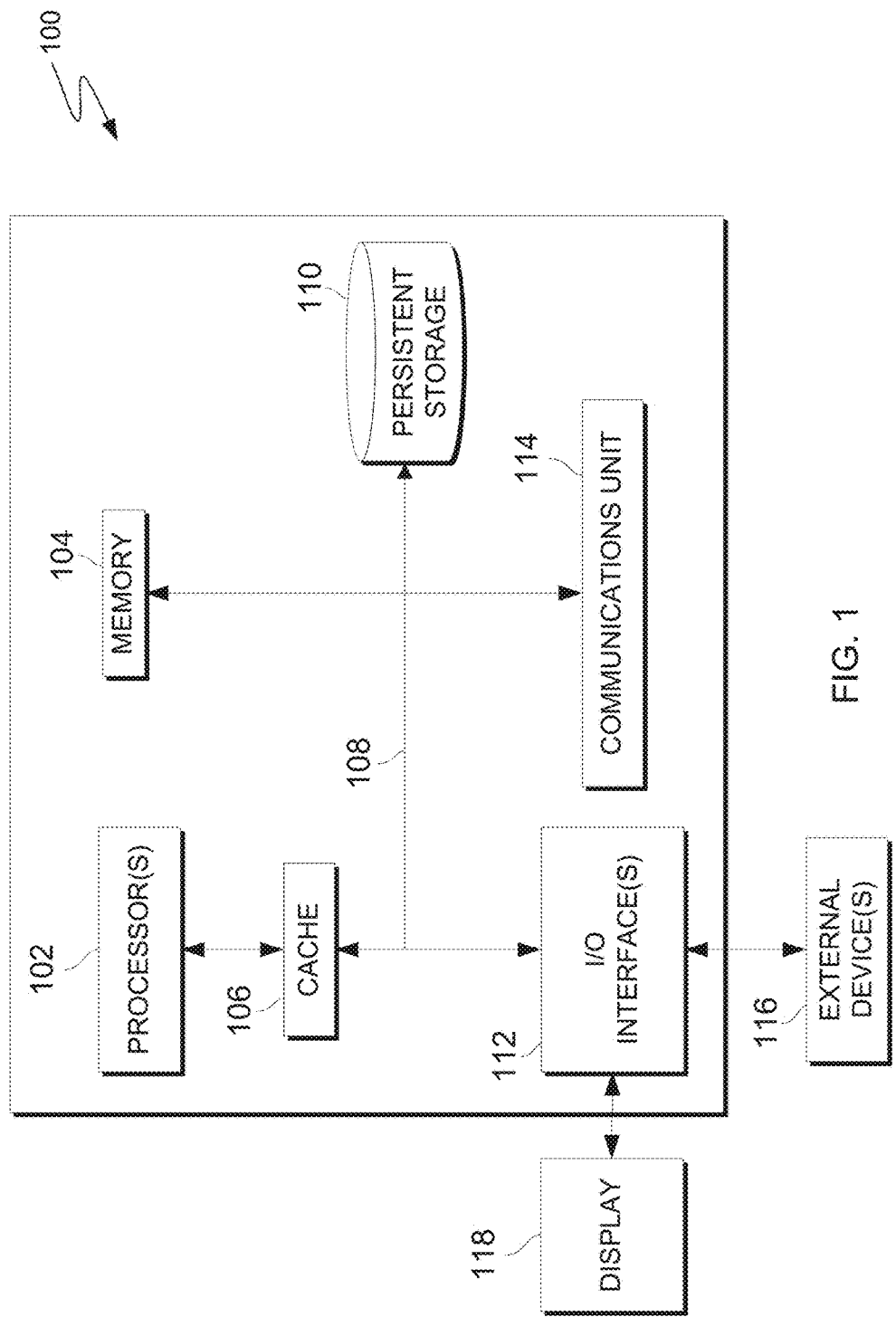
FIG. 1 is a block diagram of components of a computing device executing operations for processing traffic information, in accordance with an embodiment of the present invention.

FIG. 1 is a block diagram of components of a computing device, generally designated 100, executing operations for processing traffic information, in accordance with an embodiment of the present invention.

It should be appreciated that FIG. 1 provides only an illustration of one implementation and does not imply any limitations with regard to the environments in which different embodiments may be implemented. Many modifications to the depicted environment may be made.

Computing system 100 includes processor(s) 102, cache 106, memory 104, persistent storage 110, input/output (I/O) interface(s) 112, communications unit 114, and communications fabric 108. Communications fabric 108 provides communications between cache 106, memory 104, persistent storage 110, communications unit 114, and input/output (I/O) interface(s) 112. Communications fabric 108 can be implemented with any architecture designed for passing data and/or control information between processors (such as microprocessors, communications and network processors, etc.), system memory, peripheral devices, and any other hardware components within a system. For example, communications fabric 108 can be implemented with one or more buses or a crossbar switch.

Memory 104 and persistent storage 110 are computer readable storage media. In this embodiment, memory 104 includes random access memory (RAM). In general, memory 104 can include any suitable volatile or non-volatile computer readable storage media. Cache 106 is a fast memory that enhances the performance of processor(s) 102 by holding recently accessed data, and data near recently accessed data, from memory 104.

Program instructions and data used to practice embodiments of the present invention may be stored in persistent storage 110 and in memory 104 for execution by one or more of the respective processor(s) 102 via cache 106. In an embodiment, persistent storage 110 includes a magnetic hard disk drive. Alternatively, or in addition to a magnetic hard disk drive, persistent storage 110 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 110 may also be removable. For example, a removable hard drive may be used for persistent storage 110. Other examples include optical and magnetic disks, thumb drives, and smart cards that are inserted into a drive for transfer onto another computer readable storage medium that is also part of persistent storage 110.

Communications unit 114, in these examples, provides for communications with other data processing systems or devices. In these examples, communications unit 114 includes one or more network interface cards. Communications unit 114 may provide communications through the use of either or both physical and wireless communications links. Program instructions and data used to practice embodiments of the present invention may be downloaded to persistent storage 110 through communications unit 114.

I/O interface(s) 112 allows for input and output of data with other devices that may be connected to computer system 100. For example, I/O interface(s) 112 may provide a connection to external device(s) 116 such as a keyboard, keypad, a touch screen, and/or some other suitable input device. External device(s) 116 can also include portable computer readable storage media such as, for example, thumb drives, portable optical or magnetic disks, and memory cards. Software and data used to practice embodiments of the present invention can be stored on such portable computer readable storage media and can be loaded onto persistent storage 110 via I/O interface(s) 112. I/O interface(s) 112 also connect to display 118.

Display 118 provides a mechanism to display or present data to a user and may be, for example, a computer monitor.

Embodiments of the present invention recognize that people (e.g., drivers) can obtain real-time traffic information via road VMS, authorized traffic reports, digital map services, social media, and the like. For example, the road VMS can provide authorized road information on the road infrastructure support; the authorized traffic report can combine automatic and manual approaches and may be easily accessed in car; the digital map services may be integrated with digital maps and accessed by mobile devices; and social media can provide real-time road information with pictures.

Embodiments of the present invention recognize, however, that the existing VMS and regular Frequency Modulation (FM) road broadcast solutions need improvement for better on-demand access. Some embodiments of the present invention provide a personalized solution for integration of personalized traffic information.

Figure 2:
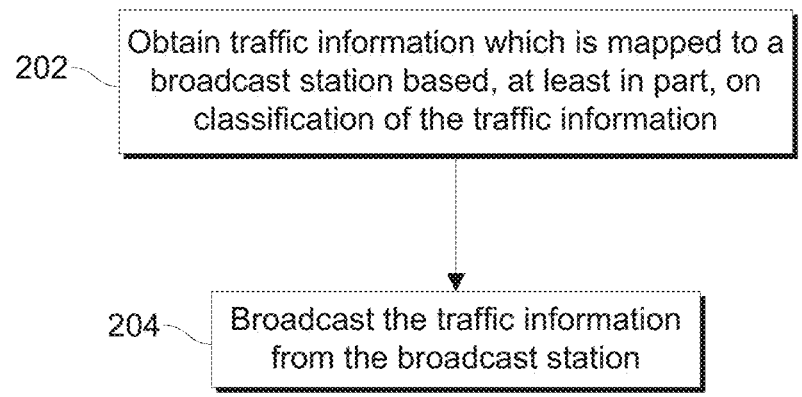
FIG. 2 is a flowchart illustrating operations for integration of personalized traffic information, which may be performed at a server/broadcast station side, in accordance with an embodiment of the present invention.

FIG. 2 is a flowchart illustrating operations for integration of personalized traffic information, which may be performed at a server/broadcast station side, in accordance with an embodiment of the present invention. The operations of FIG. 2 may be performed, for example, at a broadcast station, which is an apparatus or system suitable for obtaining and broadcasting traffic information as described herein.

At operation 202, a broadcast station obtains traffic information. The traffic information may include real-time road information and/or non-real-time road information, which may be obtained by a server from a plurality of sources and then mapped to one or more of a plurality of broadcast stations. For example, the traffic information may be mapped to the broadcast station based, at least in part, on classification of the traffic information.

Figure 3:
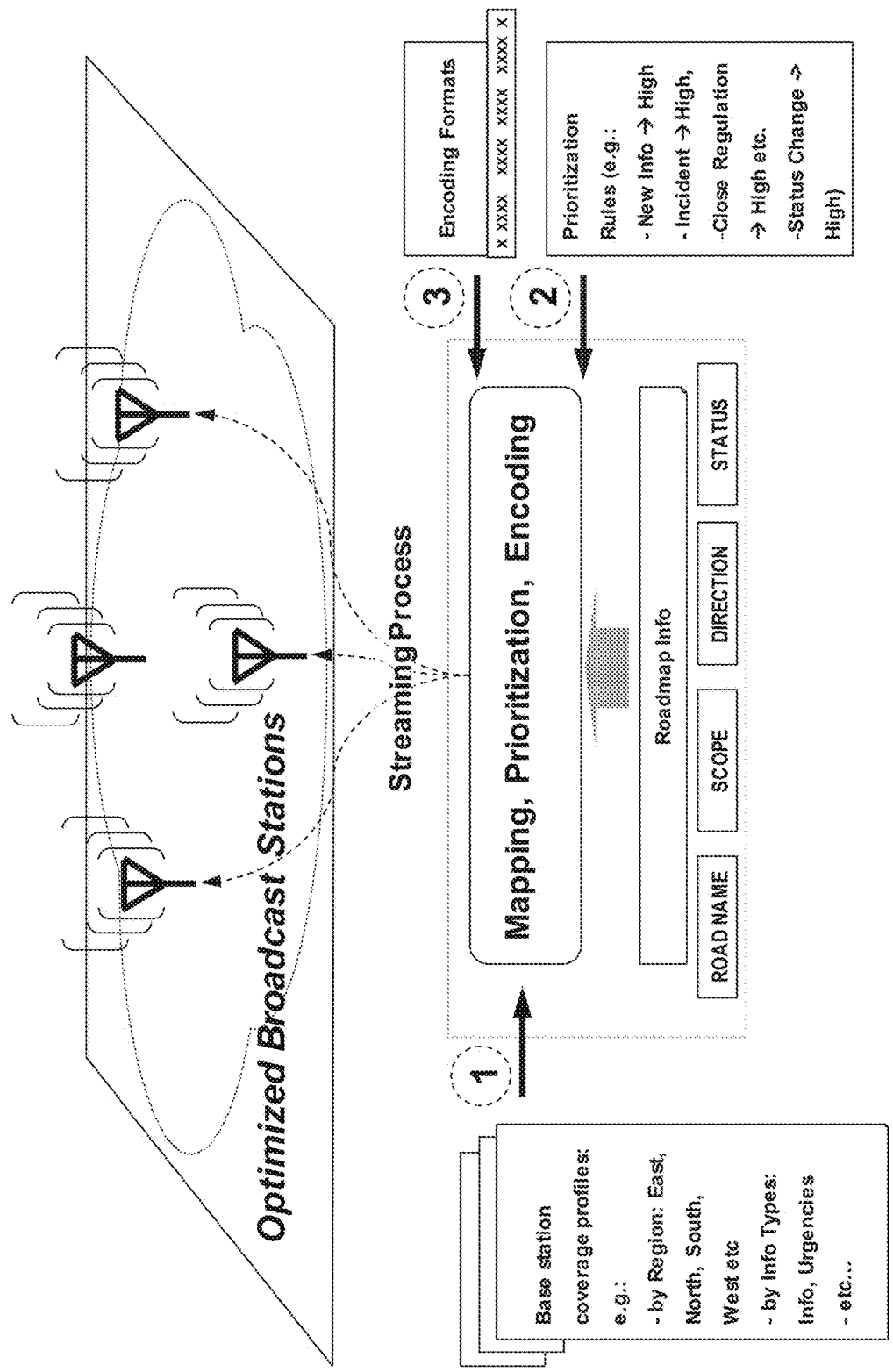
FIG. 3 is a diagram illustrating an example process and structure for broadcast stations in accordance with an embodiment of the present invention.

Specifically, the traffic information may contain some key information which indicates time and period, road name, scope, direction, status and the like. For example, the traffic information "Traffic jam on southbound Main Street at 10:30 AM" contains: 1) time information "10:30 AM", 2) road information "Main Street", 3) direction information "southbound" and 4) status information "traffic jam". The key information may be extracted and classified from the original traffic information. Then, roadmap information may be generated by aggregating the classified key information. For example, the roadmap information as shown in FIG. 3 may indicate road name, scope, direction and status of the traffic information in a structured format. The order of the road name, scope, direction, and status may vary, depending on the implementation. For example, the previous message may also be re-ordered as "Southbound Main Street jammed at 10:30 AM."

Multiple broadcast stations deployed in a broadcast network may have different coverages relative to one another. In one embodiment, a broadcast station is associated with a coverage profile. The coverage profile may include, for example, a region (the geographic area within broadcast range of the broadcast station), an information type (e.g., non-urgent events, emergencies, real-time events, forecasted or predicted events). An item of traffic information is extracted and classified to indicate a region and/or an information type so that the traffic information can be mapped to a broadcast station. For example, the traffic information "Congestion on southbound Main Street at 10:30" may be extracted and classified to indicate "Main Street" by the road information. Thus this traffic information may be mapped to a broadcast station serving a region at which Main Street is located. In another example, the traffic information "Bay Bridge is unblocked on both ways" may be mapped to a broadcast station serving a region at which Bay Bridge is located, since the classification of this traffic information may indicate "Bay Bridge" by the scope information. In still another example, the traffic information "East 2nd Ring Road has a traffic accident" may be mapped to a broadcast station which is responsible for broadcasting emergencies, since its classification indicates that the traffic information is the urgent information with status information "traffic accident".

In this way, an item of traffic information can be mapped to a broadcast station with right broadcast area and/or right broadcast type. The broadcast station in accordance with the exemplary embodiment is responsible for broadcasting at least one of: traffic information related to a predetermined region, and a predetermined type of traffic information. Additionally, the coverage of a broadcast station, which is responsible for broadcasting certain types of traffic information (such as road closures, accidents and urgent notices), may be larger than other broadcast stations. Alternatively, certain types of traffic information may be mapped to more broadcast stations. As a result, more important or urgent information can be broadcast to a larger area and thus more people can be notified.

In operation 204 as shown in FIG. 2, the traffic information is then broadcast from the broadcast station. Where multiple items of traffic information are obtained from a variety of data sources at operation 202, the broadcast station may broadcast the obtained traffic information based, at least in part, on prioritization of the traffic information. In this embodiment, the traffic information mapped to the broadcast station may be prioritized based, at least in part, on a predetermined prioritization rule. The prioritization rule may be associated with at least one of urgency, reliability, timeliness, coverage, issuer and change of the traffic information. For example, an incident may have a higher priority than a general event; the traffic information with a changed status may have a higher priority than that with an unchanged status; new information may have a higher priority; closure regulation may have a higher priority; and the like.

The broadcast station in accordance with the exemplary embodiment may support one or more broadcasting techniques such as Radio Data System (RDS), NHK (Japan Broadcasting Corporation), Subsidiary Communication Authorization (SCA), Data Radio Channel (DARC) and so on. With a proper broadcasting technique, the broadcast station can broadcast the mapped traffic information to client devices within its coverage.

FIG. 3 is a diagram illustrating an example process and structure for broadcast stations in accordance with an embodiment of the present invention. A plurality of broadcast stations may be arranged and optimized in the exemplary structure shown in FIG. 3, for example, with predetermined coverage profiles. Roadmap information may be provided by a server which can retrieve various traffic information (unstructured and structured road information) from one or more data sources. The data sources can be any governmental or third party traffic information centers, such as http://jtcx.beijing.cn/jtxx/cxts/ and http://sslk.bjjtgl.gov.cn/roadpublish/Map/trafficOutNew1.jsp.

The key information for classification, such as road name, scope, direction and status, can be extracted from the roadmap information. Then an item of traffic information is mapped to a target broadcast station based on the key information, for example, by region, information type and/or any other suitable criterion. An existing streaming process may be used in distributing the mapped traffic information to the target broadcast station.

A process of prioritization may be performed dynamically for the mapped traffic information on the target broadcast station with one or more predefined prioritization rules, as shown in FIG. 3. When there are multiple items of traffic information, the broadcast station can process and send them out according to their priorities.

Further, the broadcast station may encode the traffic information in a predetermined encoding format, and then broadcast the encoded traffic information through a corresponding radio channel such as FM radio channel.

Figure 4:
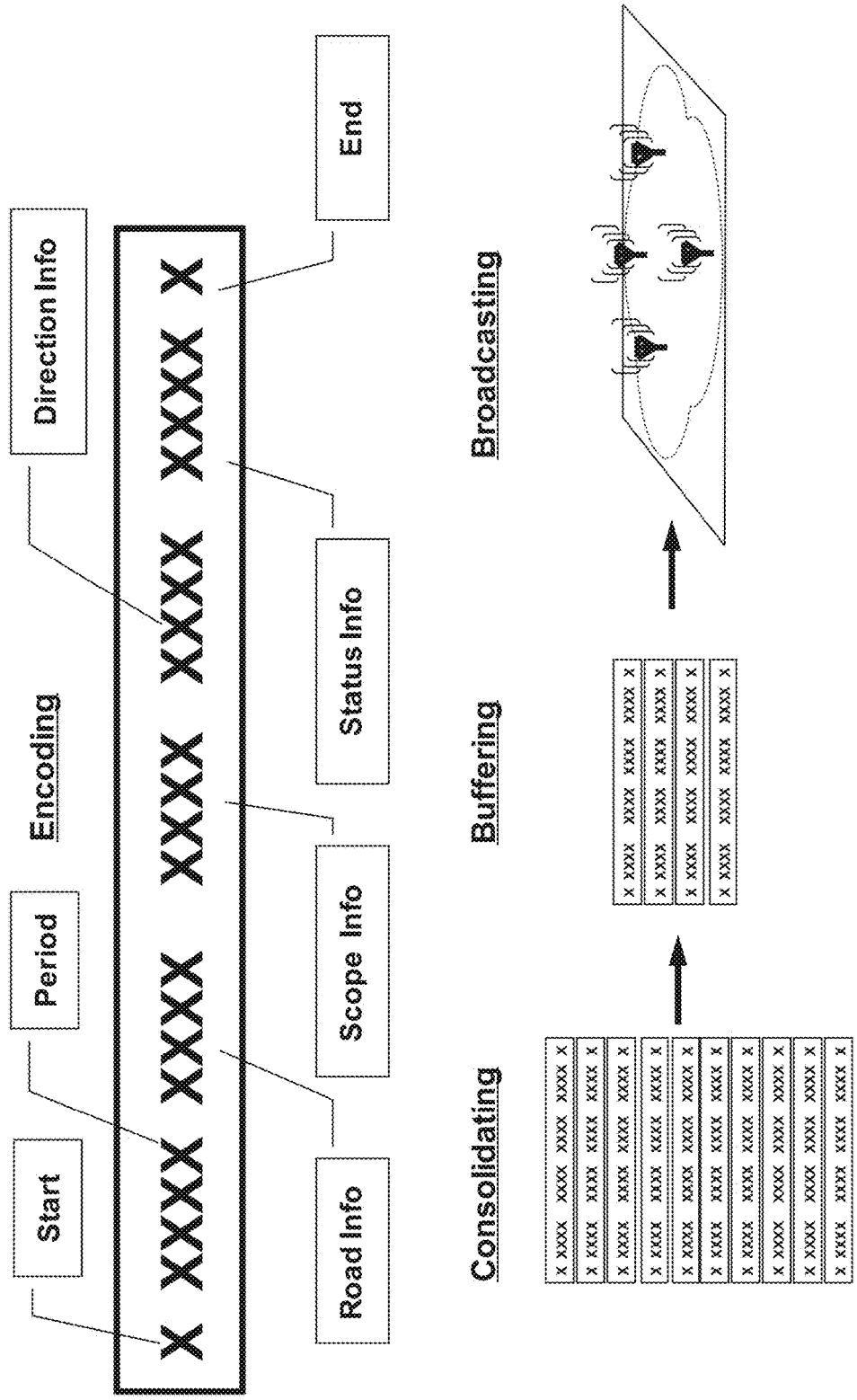
FIG. 4 is a diagram illustrating an example of an encoding implementation in accordance with an embodiment of the present invention.

FIG. 4 is a diagram illustrating an example of an encoding implementation in accordance with an embodiment of the present invention. In this exemplary implementation, the encoded traffic information comprises multiple fields including start, period, road information, scope information, direction information, status information, and end. It will be appreciated that any other suitable encoding formats may be employed and the encoded traffic information may comprise more or less fields, or alternative fields. A batch of encoded traffic information may be consolidated and buffered at the broadcast station, and then broadcast within the coverage of the broadcast station.

Figure 5:
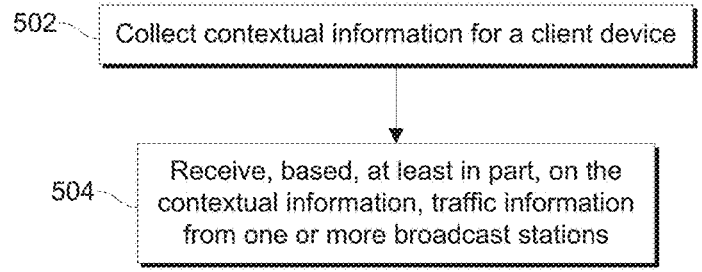
FIG. 5 is a flowchart illustrating operations for integration of personalized traffic information, which may be performed at a client device side in accordance with an embodiment of the present invention.

FIG. 5 is a flowchart illustrating operations for integration of personalized traffic information, which may be performed at a client device side in accordance with an embodiment of the present invention. It is contemplated that the client device may be any type of user equipment with capability of receiving broadcast signals, such as mobile terminal, fixed terminal, or portable terminal comprising a radio handset, station, unit, device, communicator, personal communication system (PCS) device, personal navigation device, personal digital assistants (PDAs), audio/video player, positioning device, television receiver, radio broadcast receiver, or any combination thereof.

As shown in FIG. 5, at step 502, contextual information is collected for the client device. For example, the contextual information may be collected by a Global Position System (GPS) receiver, a navigator, manual inputs and/or the like. According to this embodiment, the contextual information comprises at least one of current location, destination, planned route, actual route, and user input of the client device. The collected contextual information may be utilized to obtain user/context-specific traffic information. In other words, the user may get traffic information related to his/her travel itinerary, and/or the traffic information which he/she is interested in.

Then, at step 504, based, at least in part, on the contextual information, traffic information is received at the client device from one or more broadcast stations. As described in the above embodiments, traffic information is mapped to target broadcast stations based, at least in part, on classification of the traffic information. Accordingly, the client device may receive the traffic information associated with a region from a first broadcast station, and the traffic information associated with another region from a second broadcast station. The client device may also receive certain types of traffic information, such as urgent events, accidents or road closures, from a third broadcast station. In an exemplary embodiment, traffic information from multiple broadcast stations may be received in parallel at the client device.

The contextual information may be updated dynamically. Accordingly, the number of the broadcast stations from which the traffic information is to be received may be adjusted adaptively based, at least in part, on the contextual information. For example, the contextual information may indicate that the client device will travel from region X to region Z through region Y. The initial number of broadcast stations may be four, namely, one for urgencies and the other three for the regions of X, Y and Z. When the dynamic contextual information indicates that the client device is leaving from region X, the client device may cease receiving traffic information from the broadcast station serving region X and thus the number of broadcast stations is adjusted to three. When the client device enters region Z, the number of broadcast stations will be reduced to two, namely, one for urgencies and the other for region Z.

According to an exemplary embodiment, the received traffic information may be processed at the client device based, at least in part, on priorities associated to items of the traffic information. The priorities are determined for the items of traffic information based on source of traffic information, type of traffic information, position at which traffic information is received, preference of the user to whom traffic information will be rendered, and/or some other factors. For example, where an item of traffic information relates to a region close to the user's current location, it would have a higher priority than those related to distant regions. An item of traffic information indicating an emergency would have a higher priority than non-urgent items.

The received traffic information may be processed and integrated to a format suitable for rendering. In an exemplary embodiment, the received traffic information may be rendered selectively to the user through at least one appropriate device, such as speaker, handset, earphone, hands-free communication device, navigator (i.e., an in-vehicle navigation system), and the like. The user may select a preferable way (such as via voice and/or visual display) to obtain the received traffic information. As such, the user may get the personalized traffic information on demand.

Figure 6:
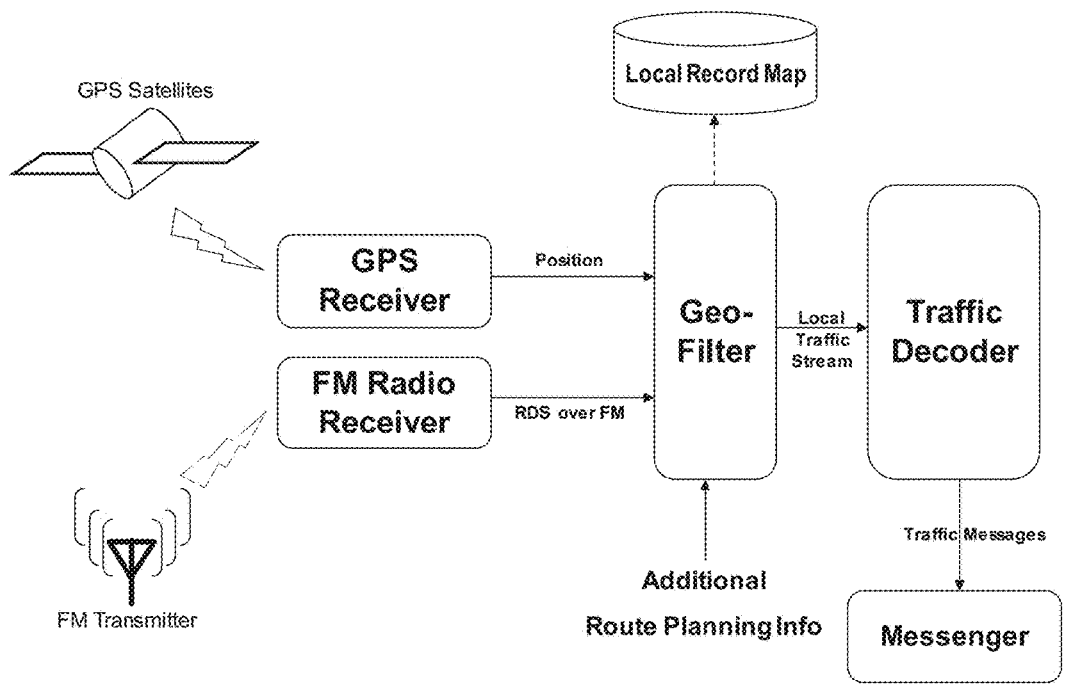
FIG. 6 is a diagram illustrating an example of the structure and process for receiving and integrating traffic information at a client device side in accordance with an embodiment of the present invention.

FIG. 6 is a diagram illustrating an example of the structure and process for receiving and integrating traffic information at a client device side in accordance with an embodiment of the present invention. The client device can operate with multiple devices such as handset, mobile phone, FM radio, navigator and any other suitable apparatus with capability of obtaining information. These devices may be standalone devices or integrated devices. These devices may be utilized for visual/voice navigation and message services.

As shown in FIG. 6, the client device obtains contextual information, for example, current position from a GPS receiver, additional route planning information from a navigator. Then the contextual information is used in the process of obtaining traffic information. According to an exemplary embodiment, one or more regions through which the user plans to travel can be determined from the current position and the additional route planning information. Thus, one or more broadcast stations associated with the one or more regions may be targeted by the radio receiver (such as a FM radio receiver) as the sources of traffic information. Additionally or alternatively, the radio receiver may receive traffic information from one or more other broadcast stations which are associated with certain types of traffic information, for example, broadcast stations responsible for broadcasting predictions, urgencies, and etc.

A geographic filter may be used to filter the received traffic information, and the filtered traffic information may be provided to a traffic decoder through a local traffic stream. In an exemplary embodiment, the traffic decoder at the client side may decode the received traffic information, which is encoded at the broadcast station side as described above. The decoded traffic information is then forwarded to one or more devices (such as a FM radio, a handset, a navigator and/or the like) selected by the user to render the traffic messages. In an exemplary embodiment, the radio receiver may adaptively select and switch radio frequencies for receiving traffic information when travelling.

As shown in the above-described embodiments, the traffic information is received at the client side through broadcast channels and, thus, uplink transmission or Internet access is not necessary at the client side.

Figure 7:
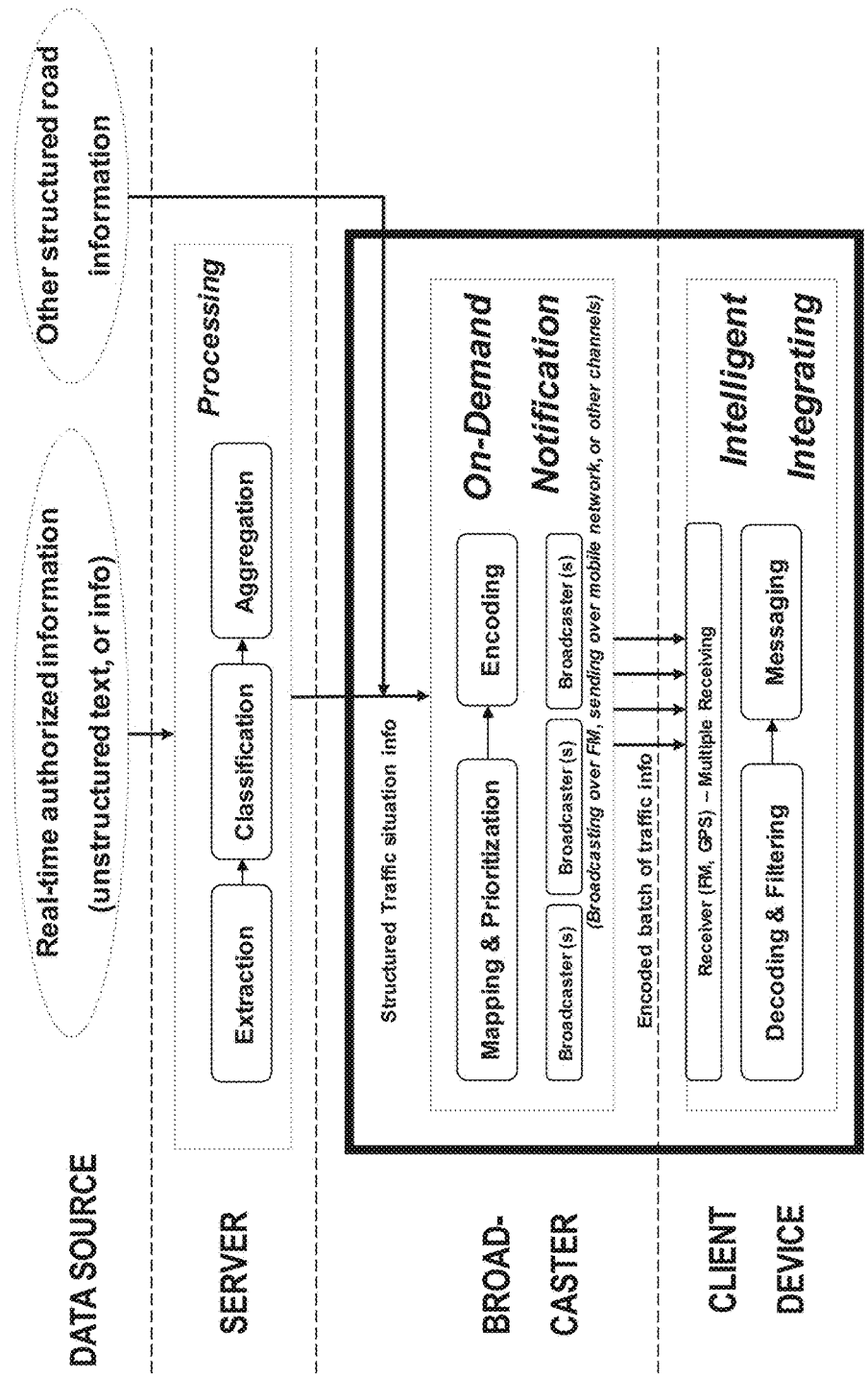
FIG. 7 is a diagram illustrating an example of a framework for integrating and interacting with personalized traffic information or road information in accordance with an embodiment of the present invention.

FIG. 7 is a diagram illustrating an example of a framework for integrating and interacting with personalized traffic information or road information in accordance with an embodiment of the present invention. As shown in FIG. 7, traffic information from various data sources (such as mixing of authorized sources) is retrieved at the server side. As described above, the traffic information may include real-time and non-real time road information, in unstructured or structured format.

The received traffic information is then processed at the server side. For example, unstructured traffic information is structuralized. As described, items of traffic information are extracted from the unstructured texts and structured into structured data including relevant fields such as road name, scope, direction, status, type, etc. Then, items of traffic information are classified, aggregated and filtered, duplicated or inaccurate items are removed, in order to ensure the validity and quality of the results. For example, classifying the items of traffic information may be based on classification type such as urgency, type, region etc. Same type of traffic information would be aggregated and duplicated traffic information from single source or multiple sources may be checked.

According to an exemplary embodiment, the structured traffic information may be mapped to a plurality of broadcaster stations at the broadcaster side, for example, by regions and types. At the broadcaster side, the mapped information may be prioritized and encoded, and then distributed to the client device side via a suitable channel, for example, FM radio channel or mobile network. The channel can be predetermined or dynamically selected.

According to an exemplary embodiment, the receiver at the client device side may support multiple protocols or standards, such as FM and GPS, as shown in FIG. 7. The receiver may be utilized to collect contextual information for the client device, for example, current location, planned route, actual route, and the user's inputs. The receiver is also configured to receive traffic information from one or more broadcasters through respective channels. The received traffic information is then decoded and filtered to provide personalized traffic information, as described above.

In this way, traffic information from multiple sources can be integrated and then used to provide personalized guidance and interaction to the user. Such intelligent interaction between the client receiver side and the server broadcast stations side may enable an exchange of customized, dynamic and contextual traffic information. This is also cost-efficient, because the existing traffic information sources can be used.

Figure 8:
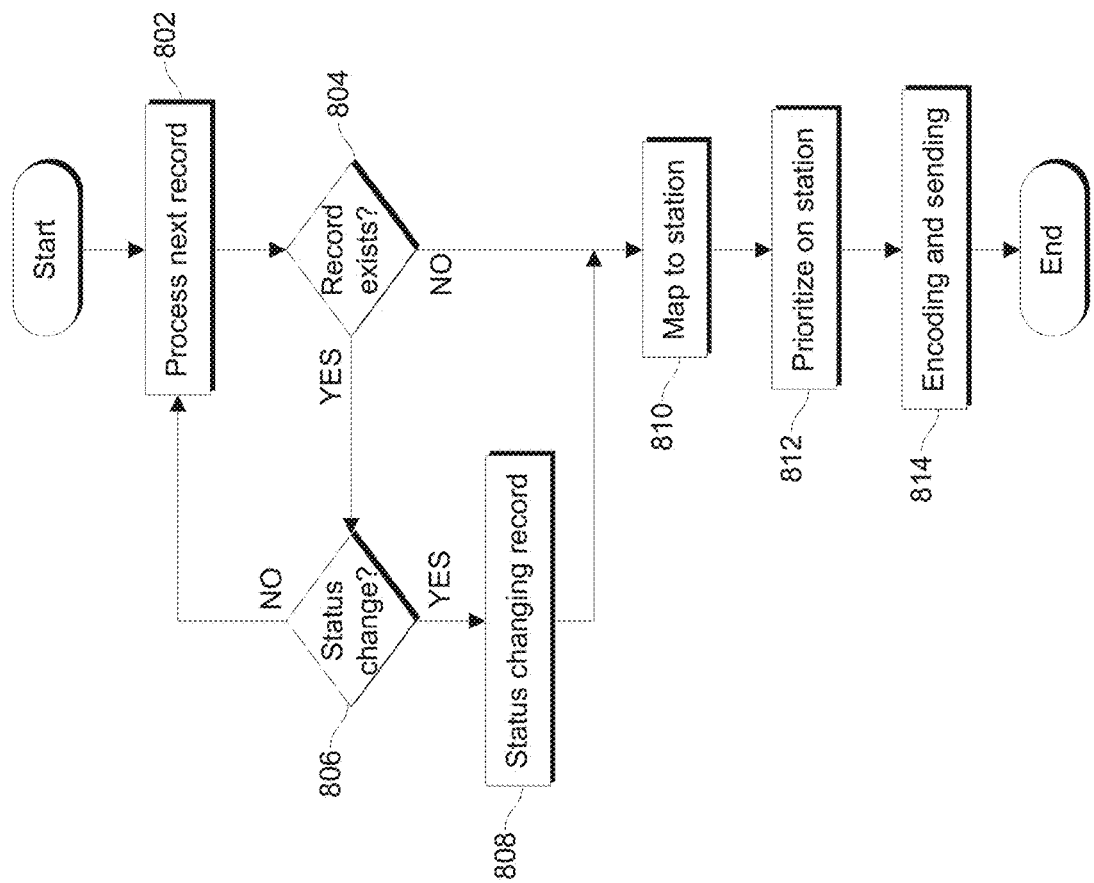
FIG. 8 is a flowchart illustrating an example of operations performed at a server/broadcast station side in accordance with an embodiment of the present invention.

FIG. 8 is a flowchart illustrating an example of operations performed at a server/broadcast station side in accordance with an embodiment of the present invention. As shown in FIG. 8, the procedure starts to process the traffic information retrieved at the server side as records. If there are one or more unprocessed records, then the procedure proceeds to step 802 where a next record is processed. At step 804, it is determined whether the record already exists in the record pool, namely, whether the new item of traffic information is an existing item in the database. If yes, then the procedure proceeds to step 806 where the record is checked to determine whether the status is changed. If the record has a changed status, then the procedure proceeds to step 808 where the record is marked as a status changing record; otherwise, the procedure returns to step 802 to retrieve another record.

Where the currently-processed record is not an existing record, then the procedure proceeds to step 810 where the record is mapped to a target broadcast station, for example, based, at least in part, on classification of the record as described above. Then, the record pool map is updated accordingly. As an example, the record pool map is a data set which helps maintaining the all traffic information as described previously and tracks the status of the information mapping to the target broadcast stations. It would also synchronize the status with the local broadcast station based on the validity of the data.

At step 812, the mapped records may be prioritized at the target broadcast station, for example, according to some predetermined prioritization rules. As such, multiple records (items) of traffic information for the target station can be processed according to their priorities. A station record list is maintained to store the records for the target station and their priorities. Then, the prioritized records may be encoded and sent out through a suitable transmission channel at step 814.

Figure 9:
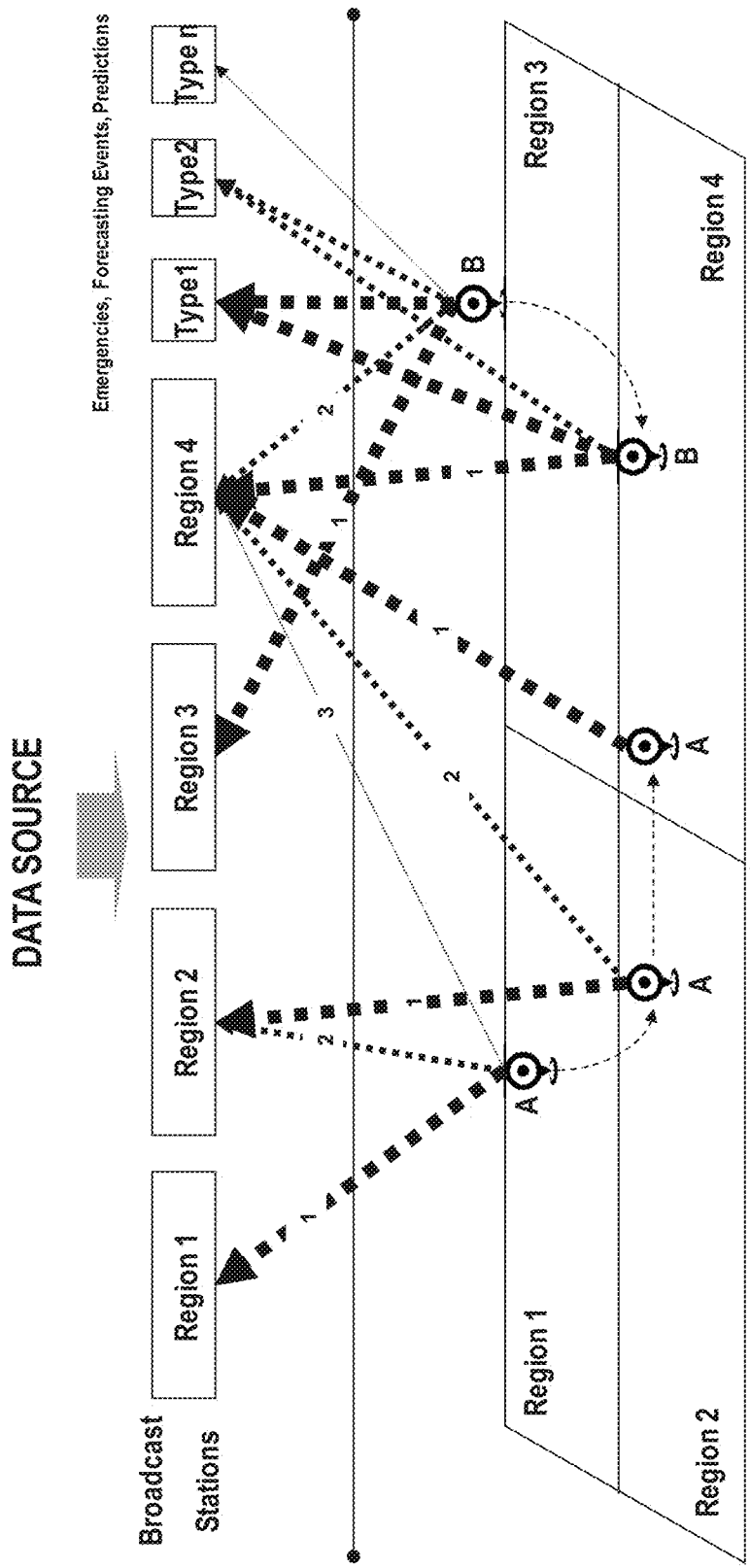
FIG. 9 is a diagram illustrating an example interaction between a client device side and a server broadcast stations side to exchange customized, dynamic and contextual traffic information, in accordance with an embodiment of the present invention.

FIG. 9 is a diagram illustrating an example interaction between a client device side and a server broadcast stations side to exchange customized, dynamic and contextual traffic information, in accordance with an embodiment of the present invention. Traffic information from a variety of data sources is collected and then classified, for example, as real-time or non-real time road information in a specific region, predictions, activity arrangement and prompt information, emergencies, forecasting events, and so on. As described above, items of traffic information are mapped to multiple target broadcast stations according to regions or types.

In FIG. 9, there are four broadcast stations employed in regions 1 to 4 and n broadcast stations responsible for types 1 to n of traffic information. The mapped traffic information is then broadcast by the target broadcast stations over appropriate data transmission channels. The data transmission channels used for broadcasting may be predefined. Additionally or alternatively, the data transmission channels available for broadcasting may be adjusted dynamically and announced to client devices, for example as an option menu. The newly mapped traffic information may be prioritized and optimized dynamically in a processing queue at a broadcast station, for example, according to urgency, reliability, timeliness, coverage, issuer, change of the traffic information and/or the like. As such, the broadcast station can broadcast the mapped traffic information within its own coverage.

The client device may be installed in a car, such as car A and car B in FIG. 9, or carried by the user. Requests for traffic information may be generated from the collected real-time context, such as current location, planned route, actual route, and user inputs. The client device in a travelling car may adaptively select proper radio frequencies and switch to one or more target broadcast stations to receive the traffic information. For example, the car A shown in FIG. 9 is going to travel through regions 1, 2 and 4 according to its route plan. The car B is going to travel through regions 3 and 4 according to its route plan. The client devices can receive traffic information from region stations (such as the broadcast stations responsible for regions 1 to 4) and type stations (such as the broadcast stations responsible for types 1 to n). Further, the client device can be configured not to receive events information from type stations.

The client device may receive traffic information from multiple broadcast stations in parallel and process items of the received traffic information based, at least in part, on their priorities. The priorities can be determined according to source of traffic information, type of traffic information, position at which traffic information is received, preference of the user to whom traffic information will be rendered, and/or the like.

For example, when the car A is in region 1, its client device may receive the traffic information related to regions 1, 2 and 4 in parallel. The items of traffic information relating to region 1, 2 and 4 may be given priorities from high to low in turn, which are denoted by dash lines with different thickness and numbers in FIG. 9. Later, when the car A departs from region 1 and comes into region 2, its client device may receive traffic information related to regions 2 and 4, not region 1 anymore. The traffic information relating to region 2 has higher priority than region 4. Finally, when the car A enters region 4, its client device may receive the traffic information relating to region 4 only.

As another example, the car B shown in FIG. 9 is enabled to receive traffic information from both region stations and type stations, while travelling through regions 3 and 4. When the car B enters region 4 from region 3, its client device may cease receiving traffic information relating to region 3, since such traffic information has become useless for the driver.

Furthermore, the received and processed traffic information may be rendered or presented to the user through various devices or media. For example, as preferred by the user, the traffic information can be presented at the car's navigation display, read out to the user through the car's speakers, or displayed on the user's mobile phone.

As described above, embodiments of this disclosure can be used to obtain and integrate traffic information from various sources. The information can include a variety of road condition and traffic information, not only current road status information, but also event information related to a specified period and/or a specified incident. The existing broadcasting techniques and communication infrastructures can be utilized to minimize costs. Furthermore, various traffic information indicating road status, emergencies, predictions and so on may be mapped to the corresponding different broadcast stations for distribution, which can balance the traffic load of broadcasting information in a whole network effectively and use system resources more efficiently.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The term "exemplary" means of or relating to an example and should not be construed to indicate that any particular embodiment is preferred relative to any other embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    collecting, by one or more processors, a planned route associated with contextual information for a client device;
    receiving, by one or more processors, traffic information based, at least in part, on the planned route, wherein the traffic information is received from one or more broadcast stations to which the traffic information has been mapped based, at least in part, on classification of the traffic information and the planned route;

adjusting, by one or more processors, a number of broadcast stations from the one or more broadcast stations that the client device receives information from based on contextual information for the planned route;
receiving, by one or more processors, traffic information from the adjusted number of broadcast stations;
classifying, by one or more processors, the received traffic information from the adjusted number of broadcast stations into information types;
prioritizing, by one or more processors, the received traffic information based on source of the received traffic information, the classified information type of the received traffic information, position the client device is located when the traffic information from each of the adjusted number of broadcast stations is received;
modifying, by one or more processors, the planned route based on the prioritized traffic information received from the adjusted number of broadcast stations; and
transmitting, by one or more processors, the modified planned route for display on the client device.

2. The method of claim 1, wherein the contextual information comprises at least one of: a current location, a destination, an actual route, and user input.

3. The method of claim 1, wherein the traffic information has been mapped further based on a geographical location of each broadcast station and a priority of each item of the traffic information, and wherein the priority is based, at least in part, on at least one of: urgency, reliability, timeliness, coverage, issuer and change of status.

4. The method of claim 1, wherein causing the communications device to communicate the traffic information includes presenting the traffic information to a user of a vehicle via an in-vehicle communications device.

5. The method of claim 1, wherein the one or more broadcast stations comprise a plurality of broadcast stations and wherein the traffic information is received from the plurality of broadcast stations in parallel.

6. The method of claim 5, wherein one or more items of the received traffic information are processed according to a priority of each item.

7. The method of claim 1, wherein the contextual information is updated dynamically.

8. The method of claim 1, wherein the traffic information includes time information, road information, direction information, and status information.

9. A computer program product comprising:
a computer readable storage medium and program instructions stored on the computer readable storage medium, the program instructions comprising:
program instructions to collect a planned route associated with contextual information for a client device;
program instructions to receive, traffic information based, at least in part, on the planned route, traffic information, wherein the traffic information is received from one or more broadcast stations to which the traffic information has been mapped based, at least in part, on classification of the traffic information and the planned route;
program instructions to adjust a number of broadcast stations from the one or more broadcast stations that the client device receives information from based on contextual information for the planned route;
program instructions to receive traffic information from the adjusted number of broadcast stations;
program instructions to classify the received traffic information from the adjusted number of broadcast stations into information types;
program instructions to prioritize the received traffic information based on source of the received traffic information, the classified information type of the received traffic information, position the client device is located when the traffic information from each of the adjusted number of broadcast stations is received;
program instructions to modify the planned route based on the prioritized traffic information received from the adjusted number of broadcast stations; and
program instructions to transmit the modified planned route for display on the client device.

10. The computer program product of claim 9, wherein the contextual information comprises at least one of: a current location, a destination, an actual route, and user input.

11. The computer program product of claim 9, wherein the traffic information has been mapped further based on a geographical location of each broadcast station and a priority of each item of the traffic information, and wherein the priority is based, at least in part, on at least one of: urgency, reliability, timeliness, coverage, issuer and change of status.

12. The computer program product of claim 9, wherein causing the communications device to communicate the traffic information includes presenting the traffic information to a user of a vehicle via an in-vehicle communications device.

13. The computer program product of claim 9, wherein the one or more broadcast stations comprise a plurality of broadcast stations and wherein the traffic information is received from the plurality of broadcast stations in parallel.

14. The computer program product of claim 13, wherein one or more items of the received traffic information are processed according to a priority of each item.

15. A computer system comprising:
one or more computer processors;
one or more computer readable storage media;
program instructions stored on the one or more computer readable storage media for execution by at least one of the one or more processors, the program instructions comprising:
program instructions to collecting a planned route associated with contextual information for a client device;
program instructions to receive, traffic information based, at least in part, on the planned route, traffic information, wherein the traffic information is received from one or more broadcast stations to which the traffic information has been mapped based, at least in part, on classification of the traffic information and the planned route;
program instructions to adjust a number of broadcast stations from the one or more broadcast stations that the client device receives information from based on contextual information for the planned route;
program instructions to receive traffic information from the adjusted number of broadcast stations;
program instructions to classify the received traffic information from the adjusted number of broadcast stations into information types;
program instructions to prioritize the received traffic information based on source of the received traffic information, the classified information type of the received traffic information, position the client device is located when the traffic information from each of the adjusted number of broadcast stations is received;
program instructions to modify the planned route based on the prioritized traffic information received from the adjusted number of broadcast stations; and program instructions to transmit the modified planned route for display on the client device.

16. The computer system of claim 15, wherein the contextual information comprises at least one of: a current location, a destination, an actual route, and user input.

17. The computer system of claim 15, wherein the traffic information has been mapped further based on a geographical location of each broadcast station and a priority of each item of the traffic information, and wherein the priority is based, at least in part, on at least one of: urgency, reliability, timeliness, coverage, issuer and change of status.

18. The computer system of claim 15, wherein causing the communications device to communicate the traffic information includes presenting the traffic information to a user of a vehicle via an in-vehicle communications device.

19. The computer system of claim 15, wherein the one or more broadcast stations comprise a plurality of broadcast stations and wherein the traffic information is received from the plurality of broadcast stations in parallel.

20. The computer system of claim 18, wherein one or more items of the received traffic information are processed according to a priority of each item.

\* \* \* \* \*